(12) United States Patent
Whelan et al.

(10) Patent No.: US 7,243,495 B2
(45) Date of Patent: Jul. 17, 2007

(54) PRESSURE BOOSTED IC ENGINE WITH EXHAUST GAS RECIRCULATION

(75) Inventors: Chris Whelan, Sussex (GB); Steven Joyce, Surrey (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 42 days.

(21) Appl. No.: 11/187,325

(22) Filed: Jul. 22, 2005

(65) Prior Publication Data

US 2006/0021346 A1   Feb. 2, 2006

(30) Foreign Application Priority Data

Jul. 23, 2004 (GB) ................. 0416457.0

(51) Int. Cl.
*F02B 33/44* (2006.01)
*F02M 25/07* (2006.01)

(52) U.S. Cl. .............. 60/605.2; 123/568.12; 123/568.21

(58) Field of Classification Search ........... 60/605.2, 60/602; 123/568.12, 568.21

See application file for complete search history.

(56) References Cited

U.S. PATENT DOCUMENTS 6,167,703 B1  1/2001  Rumez et al. ............... 60/602
6,360,541 B2 *  3/2002  Waszkiewicz et al. ...... 60/605.2
6,378,509 B1 *  4/2002  Feucht et al. ............... 60/605.2
6,430,929 B2  8/2002  Martin ......................... 60/605.2
6,729,315 B2 *  5/2004  Onodera et al. ........... 60/605.2

FOREIGN PATENT DOCUMENTS

EP   1 138 928 A2   10/2001
RU   2159340 C1 *   11/2000

* cited by examiner

*Primary Examiner*—Thai-Ba Trieu
(74) *Attorney, Agent, or Firm*—Brinks Hofer Gilson & Lione

(57) ABSTRACT

A method and apparatus for boosting the pressure of the air charge to an internal combustion engine, which has an exhaust gas recirculation (EGR) system and a turbocharger. The EGR system is arranged to recirculate exhaust gas from an engine exhaust outlet passage to the engine air inlet passage. An exhaust gas bypass passage is arranged to divert exhaust gas that would otherwise reach the turbocharger's impeller. The engine has a single, unitary control valve with a valve inlet arranged to receive exhaust gas from the engine exhaust outlet passage, and three valve outlets. A first of the valve outlets provides exhaust gas to the EGR system for recirculation to the engine air inlet passage, a second of the valve outlets provides exhaust gas to the exhaust gas bypass passage and a third of the outlets provides exhaust gas to the impeller.

14 Claims, 4 Drawing Sheets

PRESSURE BOOSTED IC ENGINE WITH EXHAUST GAS RECIRCULATION

BACKGROUND OF THE INVENTION

1. Field of the Invention

The present invention relates to a method and apparatus for boosting the pressure of the air charge to an internal combustion (IC) engine which has an exhaust gas recirculation (EGR) system, and in particular to such an engine having a combined EGR/turbocharger bypass control valve for controlling the amount of recirculated exhaust gas and the power of a turbocharger compressor. The invention is particularly although not exclusively for use in a diesel engine.

2. Related Technology

One way of boosting the pressure of the air charge to an IC engine is to use a turbocharger, which typically has a rotary compressor for compressing the intake air driven by a turbine wheel powered by engine exhaust gas. The result is that more air is sent into an engine's combustion chamber, increasing engine power.

When air is compressed, it is simultaneously heated. So, compressing engine intake air raises the temperature of air sent into the engine's combustion chamber. The raised air temperature increases the temperature of the combustion chamber and the surrounding engine components, which can increase thermal stress and reduce engine lifetime. Compressed intake air is often therefore cooled to increase the amount by which it can be compressed without detrimentally increasing combustion chamber temperature. This cooling can also generally increase the amount of air provided in the combustion chamber at a given intake pressure, as cool air is denser than hot air. Intake air cooking can therefore help to increase engine power.

Emission regulations are now beginning to dictate that many automotive engines mix intake air with recirculated exhaust gas, as this can reduce NOX (e.g. Nitrogen Dioxide etc.) emissions. NOX is formed in far higher quantities above certain combustion temperatures. Mixing recirculated exhaust gas with engine intake air can lower the combustion temperature and therefore reduce NOX formation. However, exhaust gas is hot. Like compressed intake air, it therefore benefits from cooling before it enters an engine's combustion chamber. In particular, cooling recirculated exhaust gas can increase the amount of exhaust gas that can be provided in the combustion chamber at a given intake pressure (e.g. improve mass flow).

Coolers for cooling compressed intake air are usually referred to as charge air coolers or intercoolers. Intercoolers can be cooled by engine coolant or other liquids, but are more commonly air cooled. An air cooled intercooler typically comprises an arrangement of tubes through which the compressed intake air can flow. For most car and light truck engines, intercoolers can provide sufficient cooling capacity without being inconveniently large and have relatively straightforward, robust and maintenance free designs. They are typically make from aluminum or plastics, as they only have to deal with relatively low temperatures (less than around 200° C.).

Coolers for cooling recirculated exhaust gas are usually referred to as Exhaust Gas Recirculation (EGR) coolers. An EGR cooler typically comprises a cylindrical shell containing one or more heat exchange tubes through which the exhaust gas can flow. Liquid coolant is passed through the shell around the tubes. The coolant is therefore in a heat exchange relationship with the exhaust gas and can cool it. Liquid cooling is used as it can typically provide greater cooling capacity than air cooling for a given heat exchange surface area. Thus, the heat exchange tubes can have a relatively large diameter and small surface area, which makes the EGR cooler tolerant to the build up of soot inside the tubes. EGR cooler are typically made from steel. One reason for this is that exhaust gas can be hot enough to damage other materials such as aluminum and plastics, but steel is more tolerant to high temperatures.

So, when it is desired to cool both engine intake air and recirculated exhaust gas, two separate coolers are conventionally provided; an intercooler and an EGR cooler. An example of such an arrangement is disclosed in patent document EP 1,138,928 A2. However, it is possible to use a combined EGR and inlet air cooler, for example as disclosed in U.S. Pat. No. 6,167,703 B1.

All such prior art systems entail a significant amount of cost, owing to the provision of conduits between the inlet and exhaust sides of the engine, and also valves to control the flow of exhaust gasses and the control systems associated with the operation of such valves. It is therefore desirable to minimize, as far as possible, the costs associated with such hardware.

BRIEF SUMMARY OF THE INVENTION

According to the invention, there is provided a compressor and exhaust gas recirculation (EGR) apparatus for an internal combustion engine (ICE). The apparatus includes a turbine impeller, and exhaust gas inlet leading to the impeller for providing exhaust gas from one or more combustion chambers of an ICE to drive the impeller, an exhaust gas outlet for venting exhaust gas from the impeller, a compressor arranged to be driven by the impeller, an air inlet for supplying inlet air to the compressor, a compressed air outlet leading from the compressor for providing compressed air to one or more combustion chambers of an IC engine, an exhaust gas bypass passage for controlling the amount of exhaust gas used to drive the impeller, and EGR passage for recirculating exhaust gas from the exhaust gas inlet to the compressed air outlet, and a combined turbine impeller and EGR control valve arranged to receive exhaust gas from the exhaust gas inlet and to control the relative proportions of exhaust gas flowing to: the compressed air outlet via the EGR passage; the exhaust, gas outlet via the exhaust gas bypass passage; and the impeller.

According another aspect of the invention, there is provided an IC engine having one or more combustion chambers, and engine air inlet passage leading to the combustion chambers, an engine exhaust outlet passage leading from the combustion chambers, a turbocharger with a turbine impeller arranged to be driven by exhaust gas from the engine exhaust outlet passage and a compressor driven by the impeller for compressing air admitted to the engine air inlet passage, an EGR system arranged to recirculate exhaust gas from the engine exhaust outlet passage to the engine air inlet passage, and an exhaust gas bypass passage arranged to divert exhaust gas that would otherwise reach the impeller, a control valve with a valve inlet arranged to receive exhaust gas from the engine outlet passage, and three valve outlets, a first one of the valve outlets providing exhaust gas to the EGR system for recirculation to the engine air inlet passage, a second one of the valve outlets providing exhaust gas to the exhaust gas bypass passage and a third one of the outlets providing exhaust gas to the impeller.

Also according to the invention, there is provided a method of operating an IC engine, the engine including a turbocharger having a linked turbine impeller/compressor and an exhaust gas impeller bypass, an EGR system, an a combined turbine impeller and EGR control valve, said method comprising the steps of:

i) providing exhaust gas from the engine in order to drive the impeller and power the compressor;

ii) using the compressor to compress inlet air supplied to the engine;

iii) using the bypass to divert exhaust gas from reaching the impeller;

iv) using the EGR system to recirculate a portion of exhaust gas produced by the engine;

v) using the combined turbine impeller and EGR control valve to control both the amount of the exhaust gas diverted by the bypass and recirculated by the EGR system, and the amount of exhaust gas reaching the impeller.

The use of a combined turbine impeller and EGR control valve provides significant benefits. In particular, the arrangement permits a more efficient routing of conduits around an internal combustion engine for the exhaust gas recirculation from the outlet side of the engine to the inlet side of the engine. The turbocharger will normally be situated at a side of the engine convenient to receive from the engine the exhaust gas used to drive the impeller and to provide compressed inlet air to the engine. The use of the combined valve therefore allows the minimal use of conduits for exhaust gas recirculation which are in any event required to provide exhaust gas to the impeller and to provide compressed air to the engine. The invention therefore helps conserve space in the crowded environment of a typical internal combustion engine for a motor vehicle, as well as allowing a reduction in the complexity and number of components used in routing recirculated exhaust gas between the outlet and inlet sides of the engines.

The apparatus may advantageously include a housing which surrounds the impeller, compressor and control valve. This can help provide a compact unit which is easier to install during manufacture, and which has fewer components exposed to the harsh environment of a motor vehicle engine compartment.

The control valve, exhaust gas bypass passage and EGR passage are therefore preferably integrated within a unitary apparatus.

The EGR passage may be arranged to recirculate un-cooled exhaust gas from the exhaust gas inlet to the compressed air outlet, and the compressor is arranged to provide un-cooled compressed air to the compressed air outlet. By providing cooling separates from the turbocharger apparatus, the cooling may be provided at any convenient location with respect to the engine or engine compartment.

In a preferred embodiment of the invention, the control valve prevents exhaust gas from being recirculated whenever exhaust gas is allowed to bypass the impeller. This is useful in simplifying the design and operation of the combined control valve as exhaust gas recirculation is generally not desired at high engine speeds, when the turbocharger boost is significant and being limited by use of the bypass.

Alternatively, the control valve may control the proportions of exhaust gas being recirculated as exhaust gas bypasses the impeller.

BRIEF DESCRIPTION OF THE DRAWINGS

The invention will now be further described, by way of example only, and with reference to the accompanying drawings, in which.

DETAILED DESCRIPTION OF THE INVENTION

Figure 1:
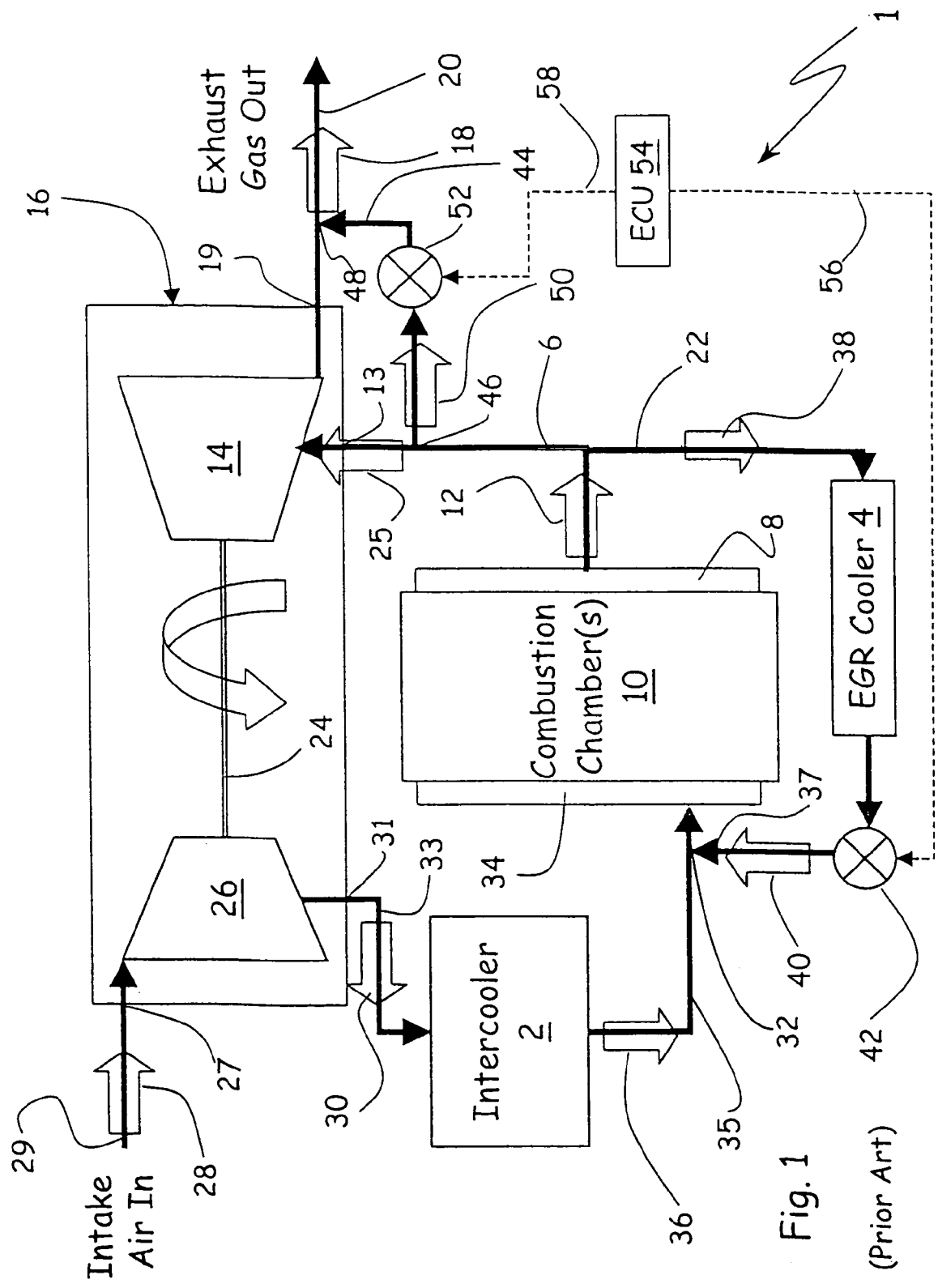
FIG. 1 is a block diagram of a conventional boosted IC engine utilizing a turbocharger unit with a conventional intercooler and conventional EGR system and EGR cooler.

FIG. 1 illustrate in schematic form a prior art turbocharged engine 1 utilizing exhaust gas recirculation (EGR). The engine 1 incorporates conventional compressed intake air cooling using a conventional air cooled intercooler 2 and conventional EGR cooling via an EGR cooler 4. The coolers 2, 4 may be formed from aluminum or steel, and the EGR cooler 4 may employ engine coolant through coolant inlets and outlets (not shown) to cool recirculated exhaust gas.

A main engine exhaust gas passage 6 leads from an exhaust manifold 8 on the output side of one or more combustion chambers 10 of the engine 1. The engine exhaust gas passage 6 conveys exhaust gas 12 from the exhaust manifold 8 towards a turbocharger exhaust gas inlet 13 that leads to a turbine impeller 14 of a turbocharger 16. Exhaust gas 18 exits the turbocharger 16 via a turbocharger exhaust outlet passage 20. An upstream EGR passage 22 branches from the main engine exhaust gas passage 6 to the EGR cooler 4. The upstream EGR passage 22 forms together with the EGR cooler 4 and a downstream EGR passage 37 an EGR path between the outlet and inlet sides 8, 34 of the combustion chambers 10.

The impeller 14 of the turbocharger 16 is coupled by a shaft 24 to a rotary compressor 26 for compressing engine intake air 28 received at a turbocharger air inlet 27 from an upstream air inlet passage 29. The impeller 14 can therefore drive the rotary compressor 26 under power of exhaust gas inlet 13. A turbocharger air outlet 31 from the compressor 26 is connected to a compressed air outlet passage 33 for conveying hot compressed engine intake air 30 to the intercooler 2. Although not shown, a compressor bypass and bypass control valve may be provided between the upstream air inlet passage 29 and the compressed air outlet passage 33 in order to help regulate the compressed inlet air 30.

The intercooler 2 is arranged to receive the hot compressed engine intake air 30 from the rotary compressor 26, cool it, and provide cooled compressed air 36 to an engine air inlet passage 35 that leads to an inlet manifold 34 on the intake side of the combustion chambers 10.

Similarly, the EGR cooler is arranged to receive a portion 38 of the hot exhaust gas 12 output by the combustion chambers 10 via the EGR branch passage 22, cool it, and provide cooled recirculated exhaust gas 40 to the downstream EGR passage 37 which meets the engine air inlet passage 35 at a confluence point or mixing point 32, at which the cooled recirculated exhaust gas 40 is mixed with the cooled compressed air 36 prior to admission to the combustion chambers 10.

An EGR regulator valve 42 is positioned between the EGR cooler 4 and the mixing point 32 to control the amount of cooled exhaust gas 40 that is recirculated to the mixing point 32 to control the amount of cooled exhaust gas 40 that is recirculated to the mixing point 32 and hence provided to the intake manifold 34 and combustion chamber 10.

In order to control and limit the exhaust gas portion 25 provided to the impeller 14 and hence the power drawn from the total exhaust gasses 12, a turbocharger exhaust gas bypass passage 44 is provided between a branch point 46 on the downstream exhaust gas outlet passage 20 and a confluence point 48 on the exhaust outlet nassae 20. Flow of bypass exhaust gas 50 along the bypass passage 44 is controlled by a wastegate valve 52.

One or more engine control units (ECU) 54 is arranged to control via control lines 56, 58 the operation the valves 42, 52 and hence the amount of recirculated exhaust gas 50 and the power boost provided by the turbocharger 16.

Figure 2:
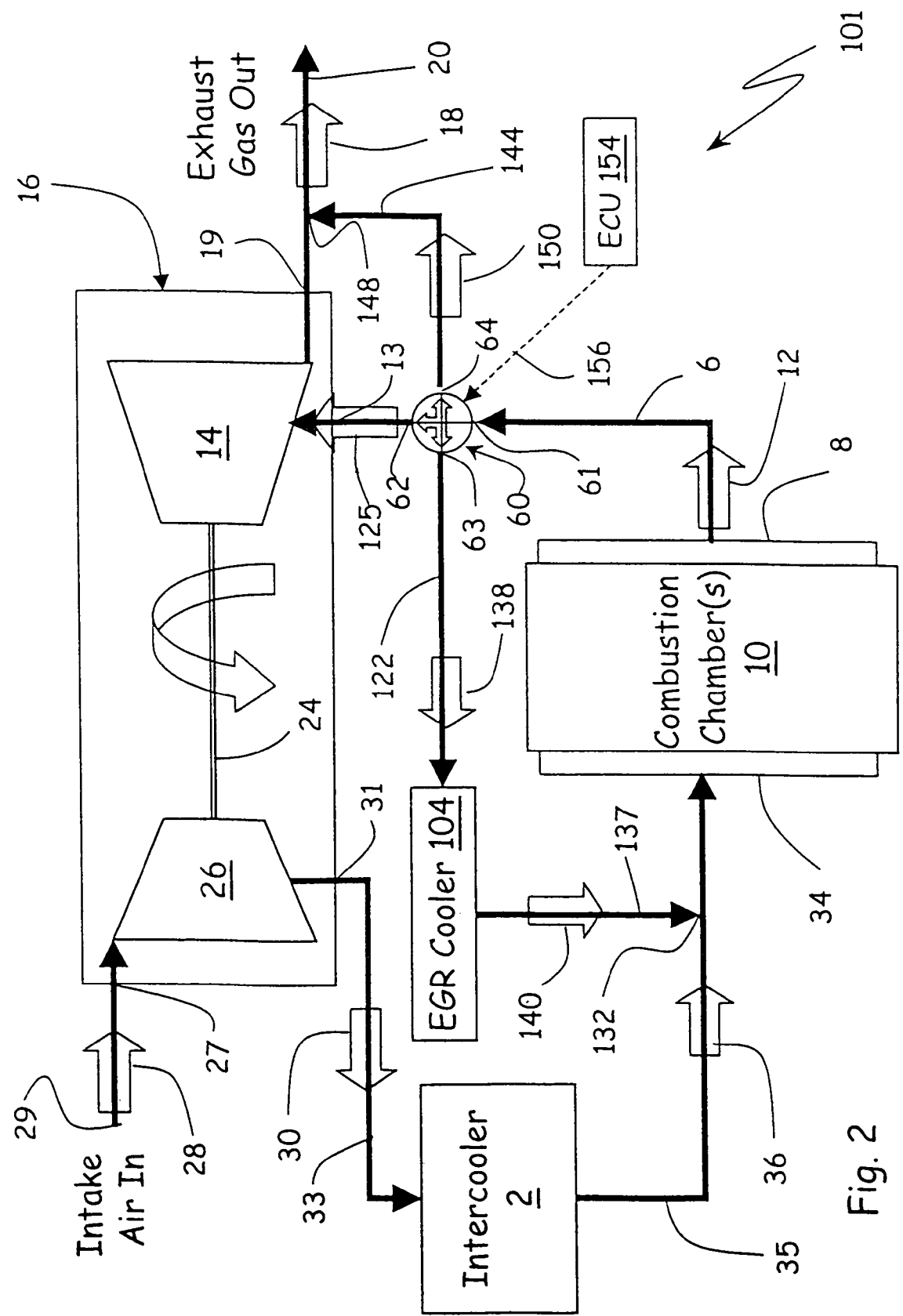
FIG. 2 is a schematic illustration of a boosted IC engine according to a first embodiment.

FIG. 2 illustrates in schematic for a turbocharged engine 101 having EGR, according to a first embodiment of the invention. For convenience, features corresponding with those of the prior art engine 1 are indicated using the same reference numerals.

The invention differs from the prior art in that there is just one, unitary EGR/bypass control valve 60 for controlling the flow the engine exhaust gas 12 to the turbocharger impeller 14, a turbocharger bypass 144, and an exhaust gas recirculation path comprising an upstream EGR passage 122, and EGR cooler 104 and a downstream EGR passage 137.

The control valve 60 is a three-way rotary valve that has one inlet 61 into which the exhaust gas 12 from the main exhaust passage 6 flows. The valve has three outlets, a first one of which 62 is connected to the turbocharger exhaust gas inlet 13, a second one of which 63 is connected to the upstream EGR passage 122 and a third one of which is connected to the bypass passage 144, the latter joining the exhaust outlet passage 20 at confluence point 148. The control valve 60 is configured to control the relative proportions of exhaust gas 125, 138, 150 supplied to the impeller 14, the EGR system 122, 104, 137 and the exhaust gas bypass passage 144.

As with the first embodiment 1, compressed air 30 from the turbocharger air outlet 31 from the compressor 26 is connected to a compressed air outlet passage 33 for conveying the hot compressed engine intake air 30 to the intercooler 2. The cooled compressed air 36 in the engine air inlet passage 35 is then mixed with cooled recirculated exhaust gas 140 are mixed at a confluence point 132 upstream of the inlet manifold 34.

The mixing point 132 comprises a venturi (not shown). More specifically, the mixing point 132 has a constricted throat for passing the cooled compressed engine intake air 36. An inlet is provided in the side wall of the constricted throat for admitting the cooled exhaust gas 140, after which the gas combination 36, 140 is provided to the inlet manifold 34 on the intake side of the combustion chambers 10.

An engine control unit (ECU) 154 is arranged to control, via a control line 156, the operation the control valve 60 and hence the amount of recirculated exhaust gas 140, bypass exhaust gas 150 and exhaust gas 125 provided to the impeller 14, and hence the power boost provided by the turbocharger 16.

Figure 4:
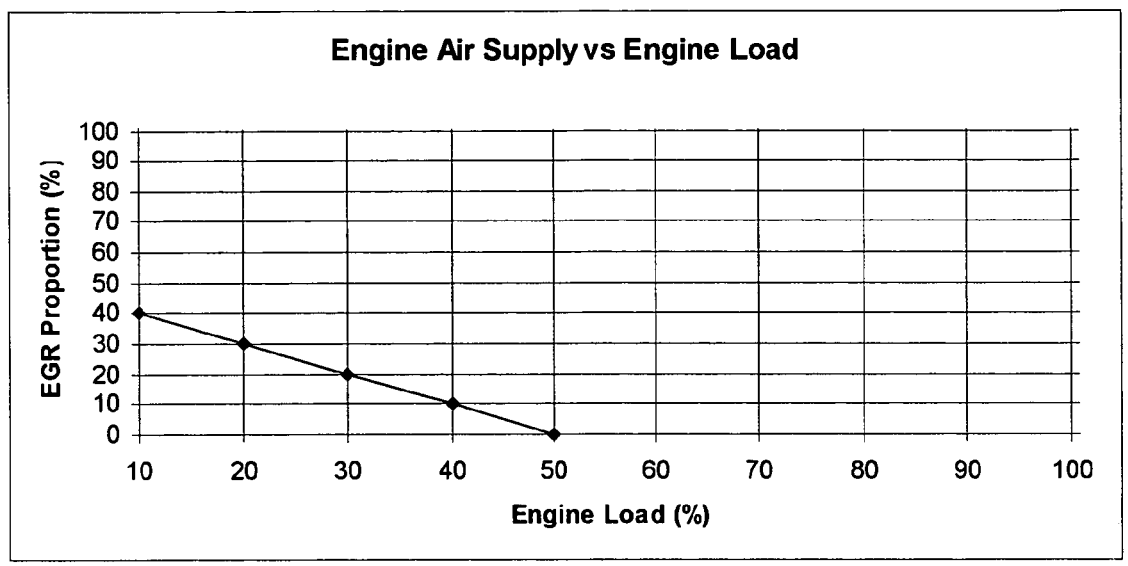
FIG. 4 is a plot showing the proportion of recirculated exhaust gas in the total gasses admitted in the air inlet to the engine in the embodiments of the invention.

The amount of exhaust gas that is recirculated 138 to the mixing point 132 is controlled by varying the amount of exhaust gas that flows through the various valve outlets 62, 63, 64 of the control valve 60. The amounts of both compressed intake air 30 and recirculated exhaust gas 138 that pass through, respectively the intercooler 2 and the EGR cooler 104 are varied depending on engine load, as shown in FIG. 4, which shows a plot of the proportion of recirculated exhaust gas 140 in the total gas combination 36, 140 provided to the inlet manifold 34. As can be seen, the proportion is a maximum of about 40% at a minimum engine load of 10%, and declines to zero at an engine load of about 50%.

Figure 5:
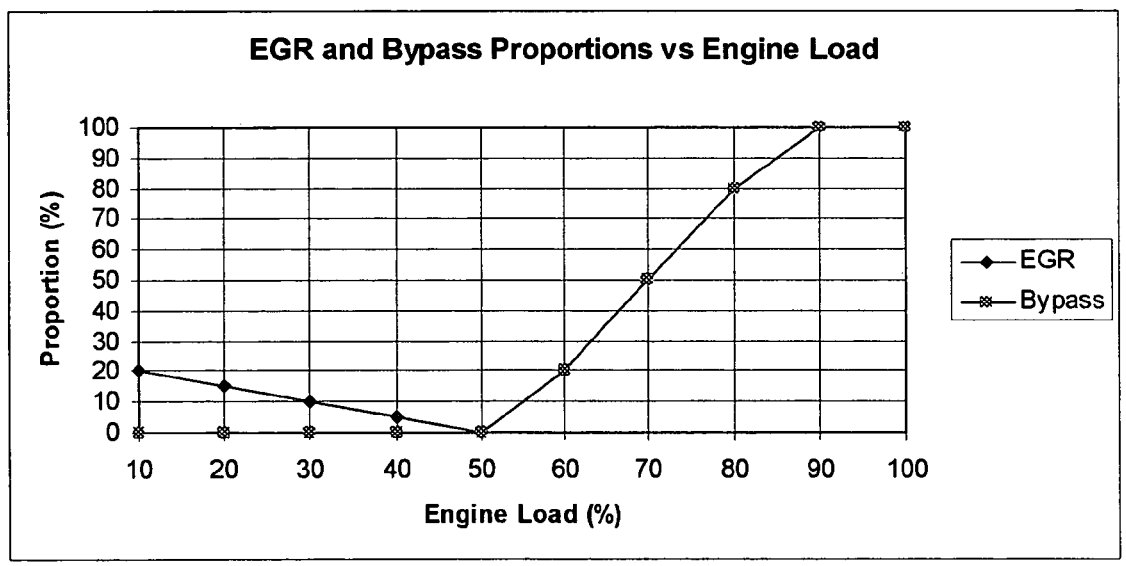
FIG. 5 is a plot showing the proportions of exhaust gas directed by the combined turbine impeller and EGR valve to EGR and the turbine impeller bypass in the embodiments of the invention.

FIG. 5 shows how the control valve 60 under the control of the ECU 154 determines the proportions of exhaust gas flowing to the three valve outlets 62, 63, 64. At a minimum engine load of 10%, about 20% of the exhaust gas 12 is provided to the EGR path 122, 104, 137, none is provided to the bypass passage 144, meaning than 80% flows 125 to the impeller 14.

As engine load increases up to about 50%, there is still no exhaust gas provided to the bypass passage 144, and the proportion of the exhaust gas 12 provided to the EGR path 122, 104, 137 drops steadily to zero, at which point all of the exhaust gas 12 flows 125 to the turbocharger impeller 14.

Above 50% engine load, the amount of exhaust gas provided 125 to the bypass 144 increases in order to limit the speed of the turbocharger 16, and hence the engine power, while none of the exhaust gas 12 is provided to the EGR path 122, 104, 137. Above an engine speed of 90%, all the exhaust gas 12 bypasses the impeller 14.

Figure 3:
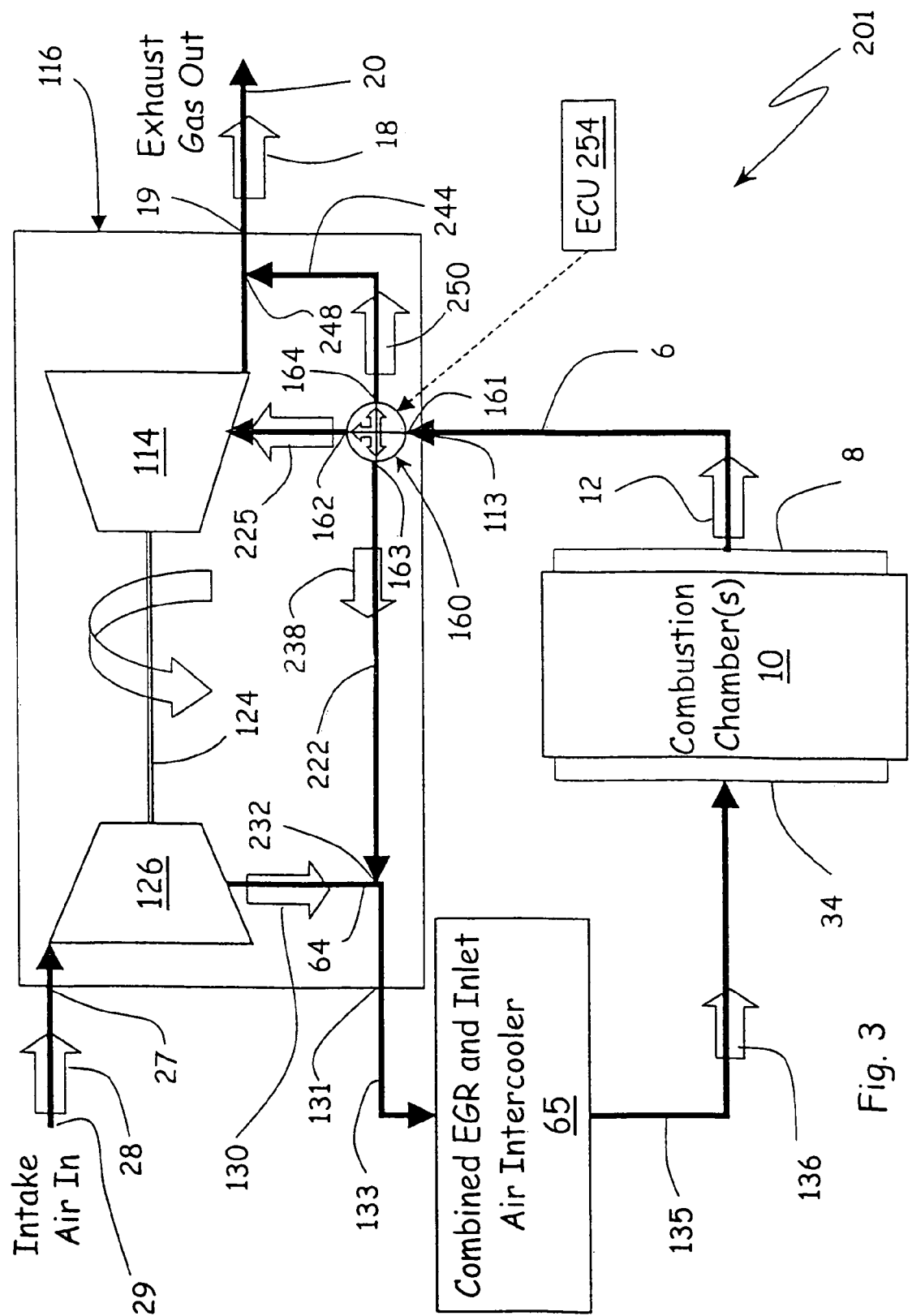
FIG. 3 is a schematic illustration of a boosted internal combustion engine according to a second embodiment of the invention of the invention similar to the first embodiment in which the combined turbine impeller and EGR valve is integrated within the turbocharger unit.

FIG. 3 shows a boasted internal combustion engine according to a second embodiment 201 of the invention. The second embodiment 201 differs from the first embodiment in having a unitary EGR/bypass control valve 160 that is integrated within a turbocharger unit 116. Again for convenience, features corresponding with those of the prior art engine 1 or engine according to the first embodiment 101 are indicated using the same reference numerals as before.

As with the second embodiment 101, the control valve 160 is a rotary valve which has a single valve inlet 161 that receives all the engine exhaust gas 12, and three outlets 162, 163, 164 that convey varying proportions of exhaust gas 225, 238, 250 to the impeller 114, an EGR passage 222, and a turbocharger bypass passage 244. These exhaust gas proportions 225, 238, 250 are controlled as described above with reference to FIGS. 4 and 5 in order to control the amount of recirculated exhaust gas 238 and the power of a compressor 126 in the turbocharger unit 116.

The second embodiment 201 of the invention results in significant benefits in terms of a reduction in the number of components and exhaust gas connections which need to be provided. Because the valve 160 is internal to the turbocharger 116, so are the EGR passage 222, the bypass passage 244 and the confluence points 232, 248.

As with the first embodiment, the EGR confluence point 232 comprises a venturi (not shown) that has a constricted throat for passing un-cooled compressed engine intake air 130. An inlet is provided in the side wall of the constricted throat for admitting the un-cooled exhaust gas 238, after which the un-cooled gas combination 130, 238 is provided to a turbocharger compressed air outlet 131 and into an un-cooled compressed air passage 133 upstream of a combined intercooler 65 for cooling the mixture of compressed air 130 and exhaust gas 238. The combined intercooler may employ engine coolant through coolant inlets and outlets (not shown) to cool the mixture of compressed air 130 and recirculated exhaust gas 238.

The combined intercooler 65 provides a cooled gas mixture 136 into to an engine air inlet passage 135 that leads to the inlet manifold 34 on the intake side of the combustion chambers 10.

The invention therefore also facilitates the use of a single combined intercooler 65, rather than two separate coolers for the compressed air and recirculated exhaust gas, thus providing further benefits in terms of reduced part count and space consumed within a motor vehicle engine compartment.

The control valve 160, EGR passage, bypass passage 244, and EGR and bypass confluence points 232, 248 are preferably all housed within a turbocharger housing (not shown), for example a machined casting. More specifically, the control valve 160 may have a body cast in a casing of the turbocharger 116 around the impeller 114.

In the illustrated embodiments 101, 201, all the gas combination, that is, all the intake air and recirculated exhaust gas always passes through separate or combined coolers. However, in another embodiment (not shown), a bypass passage is connected from upstream of the EGR or combined cooler 104, 65 to a point downstream of the cooler 104, 65. For example, in the second embodiment, such a bypass passage can be connected from between the mixing point 232 or the compressor outlet 131 and the air inlet passage 135 to the intake manifold 34 of the combustion chambers 10. This bypass passage allows EGR or combined gas cooling to be bypassed during engine warm up and such like.

The engine 101, 201 of the described embodiments is preferably a diesel engine. However, the invention can equally be applied to a petrol (or "gasoline") engine, Liquid Petroleum Gas (LPG) engine or such like. Similarly, the described engines 101, 201 are intended for automotive applications, usually for cars and light trucks. However, it may of course be used in a broad range of other applications, such as for an electrical generator.

In the foregoing description, numerous specific details are set forth in order to provide a thorough understanding of the invention. It will be evident, however, to one skilled in the art that the present invention may be practiced without using these specific details. In other instances, well-known methods and structures have not been described in detail so as not to unnecessarily obscure the present invention.

For example, it may in some applications of the invention be desirable to simultaneously direct some of the exhaust gas through the bypass while some gas is directed through the EGR system. Similarly the recirculated exhaust gas need not be directed through a venturi in the mixing of the recirculated exhaust gas and the inlet air.

Likewise, the described embodiments of the invention are only examples of how the invention may be implemented. Modifications, variations and changes to the described embodiments will occur to those having appropriate skills and knowledge. These modifications, variations and changes may be made without departure from the scope of the invention defined in the claims.

The invention claimed is:

1. A method of operating an internal combustion engine, said engine comprising a turbocharger having a linked turbine impeller/compressor and an exhaust gas turbine impeller bypass, an exhaust gas recirculation (EGR) system, and a combined turbine impeller and EGR control valve, said method comprising the steps of:
  i) providing via the control valve exhaust gas from the engine in order to drive the turbine impeller and power the compressor;
  ii) using the compressor to compress inlet air supplied to the engine;
  iii) using the control valve to divert exhaust gas from reaching the turbine impeller;
  iv) using the control valve to recirculate a portion of exhaust gas produced by the engine via the EGR system; and
  v) using the control valve to control the amount of the exhaust gas diverted and recirculated by the EGR system, and hence the amount of exhaust gas reaching the turbine impeller.

2. The method of claim 1 wherein the diverted exhaust gas is diverted to the bypass.

3. A compressor and exhaust gas recirculation (EGR) apparatus for an internal combustion engine (ICE) having one or more combustion chambers, said apparatus comprising a turbine impeller, an exhaust gas inlet leading to the turbine impeller for providing exhaust gas from the one or more combustion chambers of the ICE to drive the turbine impeller, an exhaust gas outlet for venting exhaust gas from the turbine impeller, a compressor arranged to be driven by the turbine impeller, and air inlet for supplying inlet air to the compressor, a compressed air outlet leading from the compressor for providing compressed air to the one or more combustion chambers of the ICE, an exhaust gas bypass passage for controlling the amount of exhaust gas used to drive the turbine impeller, an EGR passage for recirculating exhaust gas from the exhaust gas inlet to the compressed air outlet, and a combined turbine impeller and EGR control valve arranged to receive exhaust gas from the exhaust gas inlet and to control the relative proportions of the exhaust gas flowing to the compressed air outlet via the EGR passage, to the exhaust gas outlet via the exhaust gas bypass passage and through the turbine impeller.

4. The compressor and EGR apparatus as claimed in claim 1, further comprising a common housing surrounding the turbine impeller, compressor and control valve.

5. The compressor and EGR apparatus as claimed in claim 1, in which the control valve, exhaust gas bypass passage and EGR passage are integrated within a unitary apparatus.

6. The compressor and EGR apparatus as claimed in claim 1, in which the EGR passage is arranged to recirculate un-cooled exhaust gas from the exhaust gas inlet to the compressed air outlet and the compressor is arranged to provide un-cooled compressed air to the compressed air outlet.

7. The compressor and EGR apparatus as claimed in claim 1 in which the control valve is configured to prevent exhaust gas from being recirculated whenever exhaust gas is allowed to bypass the turbine impeller.

8. The compressor and EGR apparatus as claimed in claim 1, in which the control valve is configured to prevent exhaust gas from bypassing the turbine impeller whenever exhaust gas is being recirculated.

9. The compressor and EGR apparatus as claim in claim 1, in which the control valve is configured to control the proportion of exhaust gas being recirculated when exhaust gas bypasses the turbine impeller.

10. The compressor and EGR apparatus as claimed in claim 1, in which the control valve is a rotary valve.

11. The internal combustion engine as claimed in claim 10, further comprising a combined intercooler for cooling a mixture of compressed air and recirculated exhaust gas.

12. An internal combustion engine, comprising one or more combustion chambers, an engine air inlet passage leading to the one or more combustion chambers, an engine exhaust outlet passage leading from the one or more combustion chambers, a turbocharger with a turbine impeller arranged to be driven by exhaust gas from the engine exhaust outlet passage and a compressor driven by the turbine impeller for compressing air admitted to the engine air inlet passage, an exhaust gas recirculation (EGR) system arranged to recirculate exhaust gas from the engine exhaust outlet passage to the engine air Inlet passage, and an exhaust gas bypass passage arranged to divert exhaust gas that would otherwise reach the turbine impeller, wherein the engine further comprises a control valve with a valve inlet and three valve outlets, the valve inlet arranged to receive exhaust gas from the engine exhaust outlet passage, a first one of the three valve outlets providing exhaust gas to the EGR system for recirculation to the engine air inlet passage, a second one of the three valve outlets providing exhaust gas to the exhaust gas bypass passage and a third one of the three valve outlets providing exhaust gas to the turbine impeller.

13. The internal combustion engine as claimed in claim 12, in which the control valve is configured to control the relative proportions of exhaust gas supplied to the EGR system, the exhaust gas bypass passage and the turbine impeller.

14. The internal combustion engine as claimed in claim 12, further comprising an intercooler for cooling compressed air and an EGR cooler for cooling recirculated exhaust gas.

* * * * *

UNITED STATES PATENT AND TRADEMARK OFFICE
CERTIFICATE OF CORRECTION

PATENT NO. : 7,243,495 B2
APPLICATION NO. : 11/187325
DATED : July 17, 2007
INVENTOR(S) : Chris Whelan et al.

It is certified that error appears in the above-identified patent and that said Letters Patent is hereby corrected as shown below:

<u>In the Claims</u>

Column 8, in claim 4, line 2, before "further comprising" delete "1," and substitute --3,-- in its place.

Column 8, in claim 5, line 2, before "in which the" delete "1," and substitute --3,-- in its place.

Column 8, in claim 6, line 2, before "in which the" delete "1," and substitute --3,-- in its place.

Column 8, in claim 7, line 2, before "in which the" delete "1" and substitute --3,-- in its place.

Column 8, in claim 8, line 2, before "in which the" delete "1," and substitute --3,-- in its place.

Column 8, in claim 9, line 2, before "in which the" delete "1," and substitute --3,-- in its place.

Column 8, in claim 10, line 2, before "in which the" delete "1," and substitute --3,-- in its place.

UNITED STATES PATENT AND TRADEMARK OFFICE
CERTIFICATE OF CORRECTION

| | | |
|---|---|---|
| PATENT NO. | : 7,243,495 B2 | |
| APPLICATION NO. | : 11/187325 | |
| DATED | : July 17, 2007 | |
| INVENTOR(S) | : Chris Whelan et al. | |

It is certified that error appears in the above-identified patent and that said Letters Patent is hereby corrected as shown below:

In the Claims (cont'd)

Columns 8-9, in claim 12, line 11, after "the engine air" delete "Inlet" and substitute --inlet-- in its place.

Signed and Sealed this

Twenty-third Day of October, 2007

JON W. DUDAS
*Director of the United States Patent and Trademark Office*